(12) United States Patent
Sakurai

(10) Patent No.: US 8,743,412 B2
(45) Date of Patent: Jun. 3, 2014

(54) PRINTING DEVICE WHICH PRINTS FIRST OBJECT AND SECOND OBJECT ON THE SAME PAGE

(75) Inventor: Kunihiko Sakurai, Gifu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 436 days.

(21) Appl. No.: 12/872,246

(22) Filed: Aug. 31, 2010

(65) Prior Publication Data

US 2011/0075219 A1   Mar. 31, 2011

(30) Foreign Application Priority Data

Sep. 28, 2009   (JP) ................................. 2009-222146

(51) Int. Cl.
*G06K 15/00* (2006.01)

(52) U.S. Cl.
USPC .......... 358/1.18; 358/1.17; 358/1.2; 715/209; 715/210; 715/243; 715/251; 715/788

(58) Field of Classification Search
USPC .............. 345/418; 358/1.13, 1.15, 1.17, 1.18, 358/1.2; 382/177, 293; 715/205, 209, 210, 715/229, 243, 251, 255, 764, 769, 788
See application file for complete search history.

(56) References Cited

U.S. PATENT DOCUMENTS

| | | | |
|---|---|---|---|
| 5,495,561 A * | 2/1996 | Holt ............................. | 358/1.15 |
| 2004/0060011 A1 | 3/2004 | Nitta et al. | |
| 2004/0068698 A1 | 4/2004 | Wu et al. | |
| 2004/0090460 A1 * | 5/2004 | Kawahara ..................... | 345/764 |
| 2004/0095587 A1 * | 5/2004 | Brown et al. .................. | 358/1.2 |
| 2004/0169888 A1 * | 9/2004 | Eveland et al. ............... | 358/1.18 |
| 2004/0205624 A1 * | 10/2004 | Lui et al. ........................ | 715/525 |
| 2005/0091585 A1 * | 4/2005 | Parikh et al. .................. | 715/517 |
| 2005/0262454 A1 * | 11/2005 | Chase et al. ....................... | 716/4 |
| 2008/0123138 A1 * | 5/2008 | Banerjee et al. ............. | 358/1.18 |
| 2009/0002764 A1 * | 1/2009 | Atkins et al. ................. | 358/1.18 |
| 2009/0033999 A1 * | 2/2009 | Nishiyama ................... | 358/1.18 |
| 2009/0150769 A1 * | 6/2009 | Konnola et al. .............. | 715/251 |
| 2010/0313155 A1 * | 12/2010 | Willekes et al. .............. | 715/769 |

FOREIGN PATENT DOCUMENTS

| | | | | |
|---|---|---|---|---|
| GB | 2406254 A | * | 3/2005 | ............. H04N 1/387 |
| JP | 2004-133905 A | | 4/2004 | |
| JP | 2004-175095 | | 6/2004 | |
| JP | 2005-246796 A | | 9/2005 | |
| JP | 2007-13467 | | 1/2007 | |

OTHER PUBLICATIONS

Japanese Official Action dated Apr. 23, 2013 together with English translation from related JP2009-222146.

* cited by examiner

*Primary Examiner* — David S Cammack
(74) *Attorney, Agent, or Firm* — Scully, Scott, Murphy & Presser, PC

(57) ABSTRACT

The printing device includes an original data acquiring unit, a first determining unit, a first data generating unit, and a printing unit. The original data acquiring unit is configured to acquire original data representing at least two related objects on a worksheet. The first determining unit is configured to determine whether the at least two related objects are capable of being included in one page. The first data generating unit is configured to generate first data based on the original data. The first data generating unit generates the first data such that the at least two related objects are included in the one page when the first determining unit determines that the at least two related objects are capable of being included in the one page. The printing unit prints an image based on the first data.

8 Claims, 3 Drawing Sheets

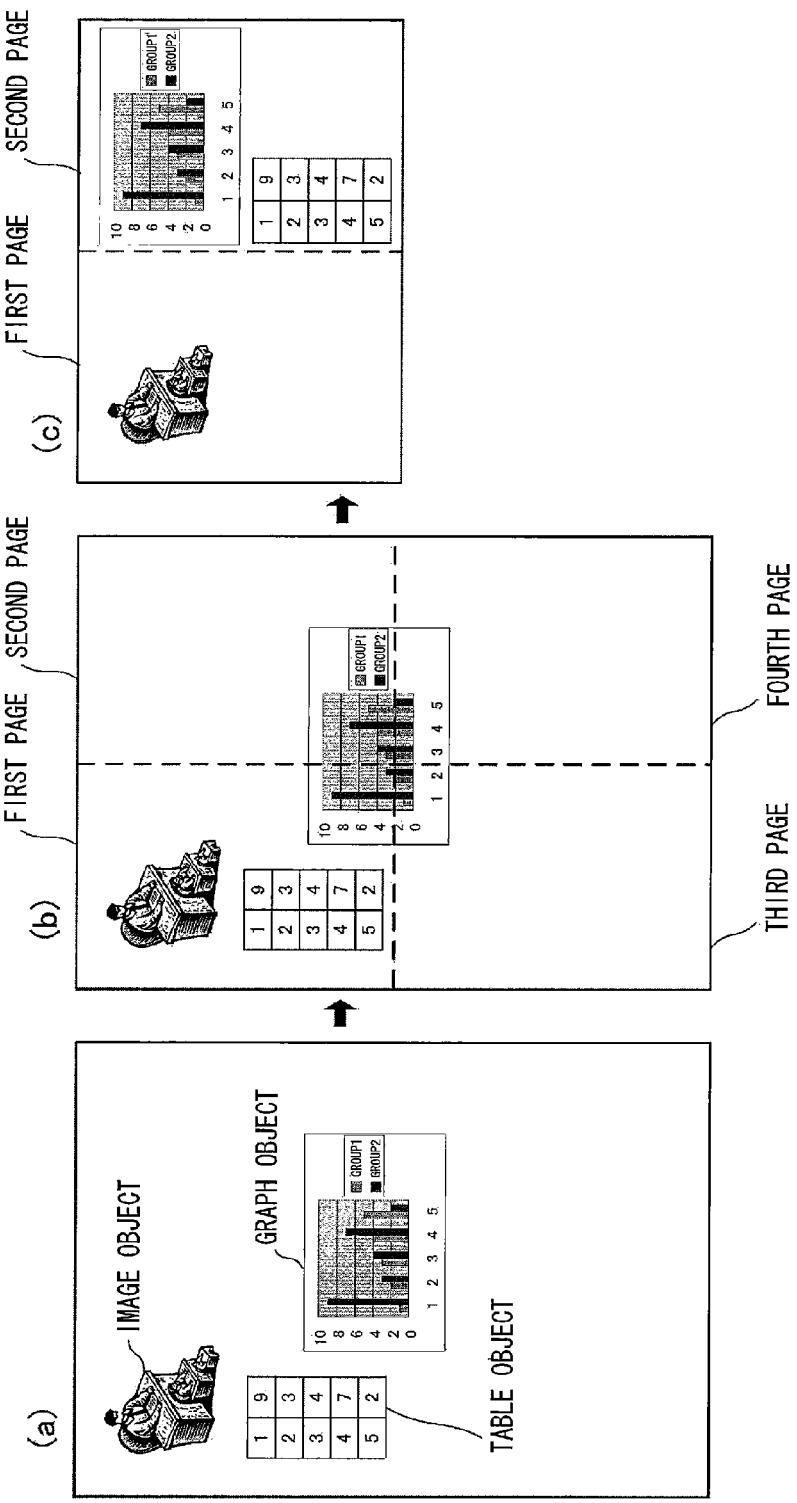

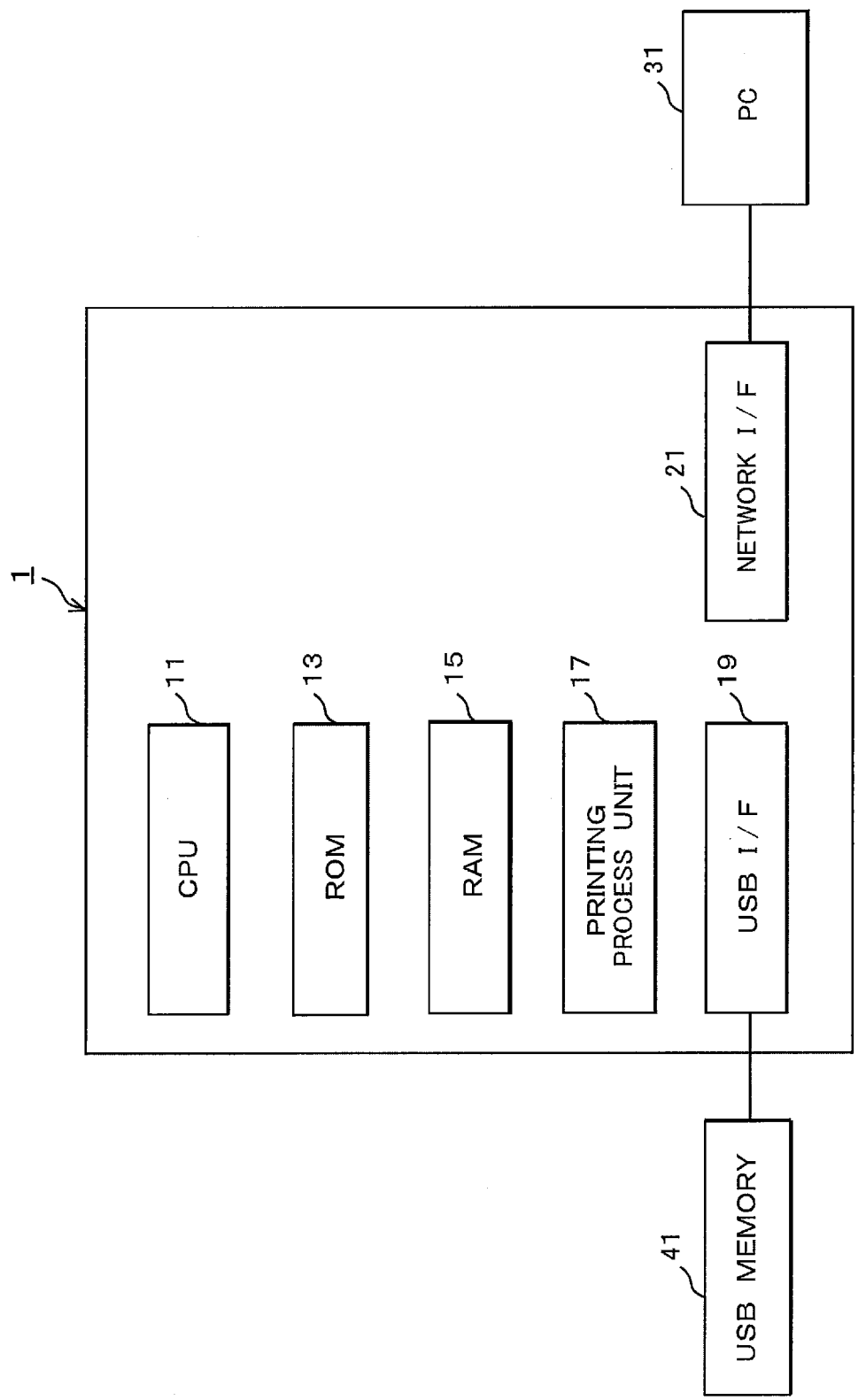

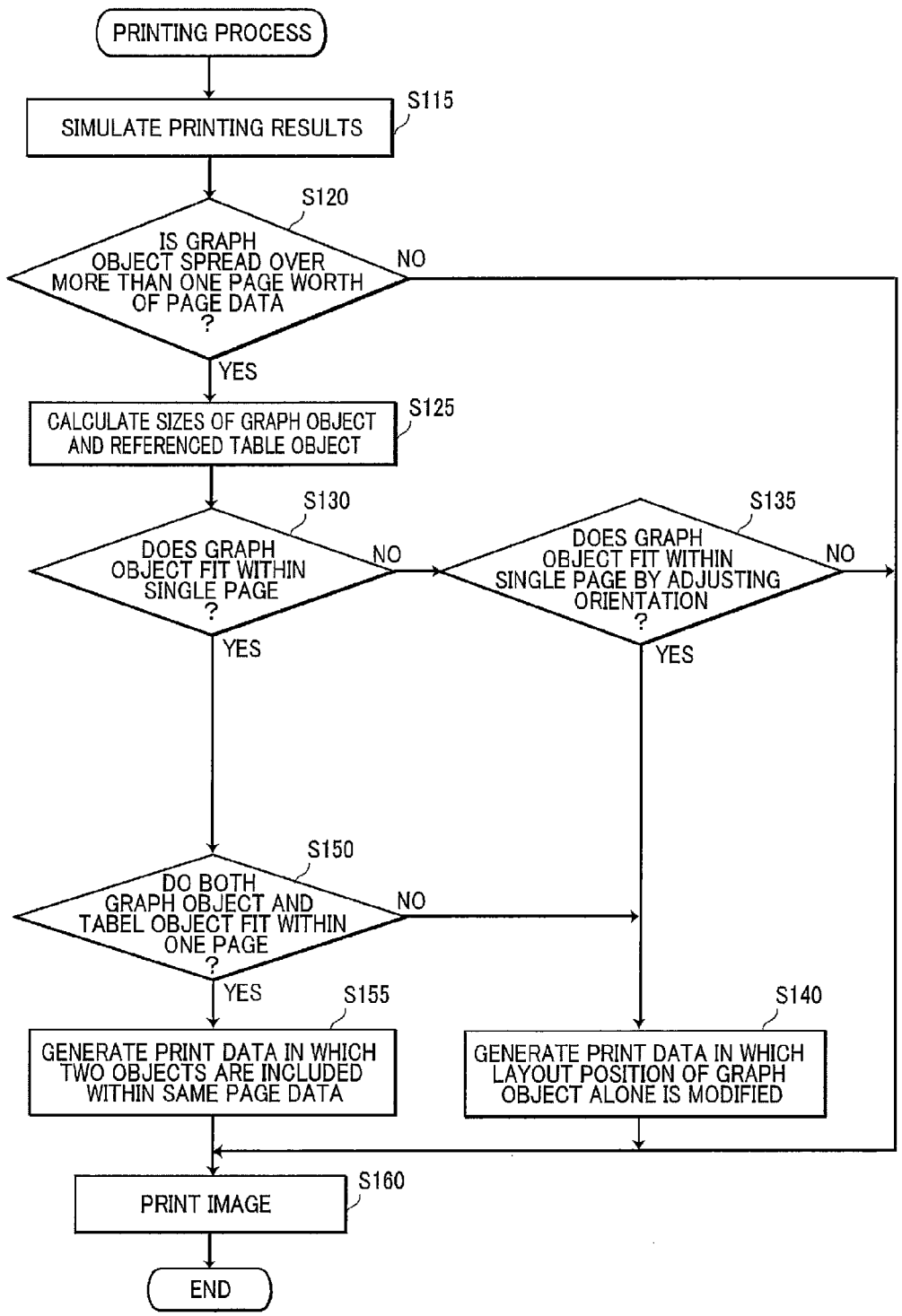

PRINTING DEVICE WHICH PRINTS FIRST OBJECT AND SECOND OBJECT ON THE SAME PAGE

CROSS REFERENCE TO RELATED APPLICATION

This application claims priority from Japanese Patent Application No. 2009-222146 filed Sep. 28, 2009. The entire content of the priority application is incorporated herein by reference.

TECHNICAL FIELD

The invention relates to a printing device and a program for printing target data that has no page concept.

BACKGROUND

Conventional printing devices generally print target data having no page concept by first dividing the print target into page data. There are printing devices well known in the art that are capable of outputting printing results for such printing targets that are easy to read for the user.

One conventional image-forming device prints continuous documents such as HTML documents having no page concept by determining positions at which the document should be divided into pages so that objects within the document can be printed in their entirety on single recording sheets. That is, the conventional image-forming device adjusts the positions at which the document is divided into pages by inserting a page break before any object that extends beyond one recording sheet so that the entire object fits within the next page data.

SUMMARY

However, the above-mentioned conventional image-forming device does not completely consider data related to objects when inserting page breaks (text that references an object, for example). Hence, there are cases in which the object and the data related to the object become separated into different page data. In such cases, the user must repeatedly look back and forth among a plurality of pages in order to refer to both the object and the data related to the object, a process that can be extremely cumbersome.

In view of the foregoing, it is an object of the invention to provide a printing device and a program capable of outputting printing results while considering both objects and data related to the objects when printing target data having no page concept.

In order to attain the above and other objects, the invention provides a printing device. The printing device includes an original data acquiring unit, a first determining unit, a first data generating unit, and a printing unit. The original data acquiring unit is configured to acquire original data representing at least two related objects on a worksheet. The first determining unit is configured to determine whether the at least two related objects are capable of being included in one page. The first data generating unit is configured to generate first data based on the original data. The first data generating unit generates the first data such that the at least two related objects are included in the one page when the first determining unit determines that the at least two related objects are capable of being included in the one page. The printing unit prints an image based on the first data.

According to another aspect, the invention provides a non-transitory computer readable storage medium storing a set of program instructions installed on and executed by a computer acquiring original data representing at least two related objects on a worksheet. The program instructions includes determining whether the at least two related objects are capable of being included in one page, generating print data based on the original data, wherein the generating generates the print data such that the at least two related objects are included in the one page when the determining determines that the at least two related objects are capable of being included in the one page, and sending the print data to a printing unit that prints an image based on the print data.

BRIEF DESCRIPTION OF THE DRAWINGS

The particular features and advantages of the invention as well as other objects will become apparent from the following description taken in connection with the accompanying drawings, in which:

FIG. 1 is an explanatory diagram illustrating an overview of an embodiment;

FIG. 2 is a block diagram showing a structure of a printing device according to the embodiment;

FIG. 3 is a flowchart illustrating steps in a printing process according to the embodiment.

DETAILED DESCRIPTION

A printing device 1 according to an embodiment of the invention will be described while referring to the accompanying drawings wherein like parts and components are designated by the same reference numerals to avoid duplicating description.

The printing device 1 directly reads data from USB memory or a memory card and directly prints this data.

Overview of the Embodiment

First, an overview of the printing device 1 according to the embodiment will be described.

The explanatory diagram (a) in FIG. 1 illustrates objects created on a spreadsheet that extends two-dimensionally in vertical and horizontal directions and has no concept of pages. That is, the spreadsheet is stored in data file that does not define concept of pages. The objects are also stored in the data file. Each object indicates an image as one entity in the spreadsheet. In other words, the objects are arranged in the spreadsheet. The objects in this example include an image object, a table object, and a graph object. The graph object is a bar graph created from information referenced in the table object. When printing the objects shown in (a) of FIG. 1 according to the conventional method, the page data for the spreadsheet is divided into four pages, as illustrated in (b) of FIG. 1. At this time, the graph object is distributed over four pages worth of page data.

When printing the objects shown in (a) of FIG. 1, the printing device 1 according to the embodiment generates print data in which the positions of the table object and the graph object have been shifted so that the page data shown in (c) of FIG. 1 is printed.

By shifting the positions of the objects in this way, the printing device 1 not only prevents the graph object from being spread over more than one page worth of page data, but also reduces the number of printed sheets. Further, since the graph object fits within one page worth of page data in this layout, the printing device 1 can produce printing results that are easier for the user to read than when the graph object is distributed over a plurality of pages worth of page data. Further, since the graph object and the table object that was referenced to produce the graph object, as described later, are printed based on the same page worth of page data, the user need not look back and forth between a plurality of pages in order to view both the graph object and the table object.

Structure of the Printing Device

Next, the printing device according to the embodiment will be described with reference to FIG. 2. FIG. 2 is a block diagram showing the structure of a printing device 1 according to the embodiment. The printing device 1 includes a CPU 11, a ROM 13, a RAM 15, a printing process unit 17, a USB interface 19, and a network interface 21.

The CPU 11 performs overall control of all components in the printing device 1. The ROM 13 stores programs that the CPU 11 executes in order to implement various processes on the printing device 1, such as a printing process of the embodiment. The RAM 15 serves both as a storage area for storing data created when the CPU 11 implements the various processes, and a storage area used as a work area in which the CPU 11 stores data when performing the various processes. The printing process unit 17 is provided with a mechanism for printing images on recording sheets. The printing device 1 acquires data stored in an external USB memory 41 via the USB interface 19 to execute printing processes. The printing device 1 is also connected to a network via the network interface 21. Accordingly, the printing device 1 can receive printing instructions from a personal computer 31, for example, via the network interface 21 when executing a printing process.

Printing Process

Next, the printing process executed by the printing device 1 according to the embodiment will be described with reference to FIG. 3. FIG. 3 is a flowchart illustrating steps in the printing process. The following description of the printing process will cover a case in which the printing device 1 prints a table object created on a spreadsheet, and a graph object created by referencing the table object.

The printing device 1 begins the printing process when the user inserts the USB memory 41 into the printing device 1 and issues a direct print command to print images based on the data file stored in the USB memory 41 and when the printing device 1 acquires the data file from the USB memory 41 via the USB interface 19. Here, the data file includes data of a table object and data of a graph object on the spreadsheet that is created by referencing the table object. In other words, the table object and the graph object is related to each other. The data of the graph object includes information specifying the referenced table object based on which the graph object is generated. When issuing the direct print command, the user also specifies a printing region of the spreadsheet, the size of printing paper, and the printing orientation of the paper.

In S115 at the beginning of the printing process shown in FIG. 3, the CPU 11 of the printing device 1 first simulates the printing results for the specified printing region. The CPU 11 generates page data by dividing objects into a plurality of pages. The image of one page worth of data is printed in the prescribed size. That is, the CPU 11 simulates the printing results based on the size and orientation of the printing paper specified when the user issued the direct print command. Specifically, the CPU 11 generates the page data based on the size and orientation of the printing paper and on the size of the printing region of the spreadsheet without considering the position or the size of the objects.

In S120 the CPU 11 determines whether the graph object is spread over more than one page worth of page data based on the results of the simulation in S115. Specifically, the CPU 11 obtains the size and position of the graph object from the simulation results and the prescribed size of one page worth of data, to determine whether the graph object is spread over more than one page worth of page data.

When the CPU 11 determines that the graph object is not spread over more than one page worth of page data (S120: NO), in S160 the CPU 11 prints the specified printing region. That is, the CPU 11 outputs, to the printing process unit 117, the printing results based on the simulation in S115.

However, if the CPU 11 determines that the graph object is spread over a plurality of pages worth of page data (S120: YES), in S125 the CPU 11 calculates the sizes of the graph object and the referenced table object. Here, the CPU 11 can determine the corresponding table object since the graph object stores information about the referenced table object. Hereinafter, the "referenced table object" will continue to be referred to simply as the "table object."

In S130 the CPU 11 determines whether the graph object fits within a single page worth of page data (that is, the CPU 11 determines whether the graph object can fit within the region of one page) based on the size of the graph object calculated in S125. In other words, the CPU 11 makes this determination by comparing the size of the graph object calculated in S125 to the prescribed size of one page worth of data in the simulation results of S115.

If the CPU 11 determines that the graph object does not fit within a single page worth of page data (S130: NO), in S135 the CPU 11 determines whether the graph object would fit within a single page worth of page data by changing the printing orientation of the object. Since the available printing orientations include a vertical (portrait) orientation and a horizontal (landscape) orientation, the CPU 11 determines whether the graph object will fit within one page worth of page data by changing the printing orientation to one of these orientations.

If the CPU 11 determines that the graph object will fit within one page worth of page data by changing the printing orientation (S135: YES), in S140 the CPU 11 generates print data in which the layout position of the graph object alone has been modified to fit within a single page worth of page data (that is, to fit within the region of the single page). In S160 the CPU 11 prints the print data generated in S140 by outputting the print data to the printing process unit 117. In other words, the printing orientation of the graph object is changed when generating print data.

By modifying the printing orientation of the graph object as described above, the printing device 1 can reliably fit the graph object on a single page worth of page data when the graph object is of a size that fits within a single page.

However, if the CPU 11 determines in S135 that the graph object will not fit within a single page worth of page data, even after modifying the printing orientation of the object, in S160 the CPU 11 prints the specified printing region. In this case, the CPU 11 outputs, to the printing process unit 117, the printing results based on the simulation in S115.

On the other hand, if the CPU 11 determines in S130 that the graph object does fit within a single page worth of page data (S130: YES), in S150 the CPU 11 determines whether both the graph object and the table object fit within one page worth of page data. Specifically, after laying out the table object of the size calculated in S125 in page data having the size based on the simulation results in S115, the CPU 11 determines whether the graph object of the size calculated in S125 can be laid out in the remaining area of the same page data.

If the graph object and the table object cannot fit together within the same page worth of page data (S150: NO), in S140 the CPU 11 adjusts the layout position of only the graph object and generates print data in which the graph object fits within a single page worth of page data. In this case, the orientation of the graph object is not modified in S140 since the CPU 11 determines in S130 that the graph object can fit within one page without modifying the orientation thereof (S130: YES). In S160 the CPU 11 prints the print data generated in S140 by outputting the print data to the printing process unit 117.

However, if the CPU 11 determines in S150 that both the graph object and the table object fit together within the same page worth of page data (S150:
YES), in S155 the CPU 11 adjusts the layout positions of both the graph object and the table object and generates print data in which the two objects are included within the same page data. That is, the CPU generates the print data such that both the graph object and the table object are included within the region of a single page. In S160 the CPU 11 prints the print data generated in S155 by outputting the print data to the printing process unit 117.

After outputting and printing the print data in S160, the CPU 11 ends the printing process.

While the invention has been described in detail with reference to specific embodiments thereof, it would be apparent to those skilled in the art that many modifications and variations may be made therein without departing from the spirit of the invention, the scope of which is defined by the attached claims.

For example, while the embodiment describes a printing device capable of directly printing data from the USB memory 41 or the like, the invention may also be applied to a terminal device, such as the PC 31, that performs the image processes described in the embodiment to generate print data. The invention may also be applied to a printer driver installed on such a terminal device that is capable of performing the image processes described in the embodiment to generate print data. Alternatively, the invention may be applied to a server that performs the image processes described in the embodiment to generate print data and that transmits the generated print data to an external device, such as, a printer or a mobile phone, via a network, for example, Internet.

Further, while the printing device 1 according to the embodiment performs a printing process on data stored in the USB memory 41 mounted in the printing device 1 via the USB interface 19, the printing device 1 may perform a printing process based on print commands transferred from any personal computer directly connected to the printing device 1 or from a personal computer connected to the printing device 1 via a network.

The printing device 1 may determine whether a table object is spread over more than one page worth of page data. When the table object is spread over a plurality of pages worth of page data but is small enough to fit within one page worth of page data, the printing device 1 may adjust the position of the table object when generating print data.

Further, in the embodiment described above, when the graph object is not spread over more than one page worth of page data (S120: NO), in S160 the printing device 1 prints the simulation results of S115, but the invention is not limited to this process. For example, after a negative determination is made in S120, the CPU 11 may determine whether both the table object and the graph object fit within one page worth of page data. If both the table object and the graph object fit within one page worth of page data, the printing device 1 adjusts the position of the graph object within the page data to which the table object belongs.

In the process of S155 according to the embodiment, the printing device 1 employs a method of adjusting the layout positions of both the graph object and the table object in order to fit both the graph object and the table object within one page worth of page data. However, if the CPU 11 determines that both the graph object and the table object fit within one page worth of page data, the printing device 1 may be configured to adjust the layout position of only one object. For example, the printing device 1 may be configured to shift only the layout position of the graph object in the page data to which the table object belongs.

Further, the order in which the processes of S130 and 5150 are performed is not limited to the order used in the embodiment. For example, after S125, in S150 the CPU 11 of the printing device 1 may first determine whether both the graph object and the table object fit within one page worth of page data. In this case, if a positive determination is made in S150, the CPU 11 advances to S155. If a negative determination is made in S150, the CPU 11 performs a determination in S130. If a positive determination is made in S130, the CPU 11 performs S140 without modifying the orientation of the graph object. If a negative determination is made in S130, the CPU 11 performs a determination in S135. If a positive determination is made in S135, the CPU 11 performs S140 with the orientation of the graph object being changed. If a negative determination is made in S135, the CPU 11 advances to S160.

In S135 of the printing process according to the embodiment, the printing device 1 determines whether the graph object can fit within one page worth of page data by adjusting the printing orientation to either a vertical orientation or a horizontal orientation, but a diagonal orientation may also be available as one printing orientation. In this case, in S160 the printing orientation of the graph object is changed according to the diagonal orientation. Therefore, if the object has the shape of a parallelogram, for example, in some cases a parallelogram that does not fit within one page worth of page data at its original orientation may fit within a page worth of page data when modified to a diagonal orientation.

Further, while the printing target in the embodiment is a set of objects created on a spreadsheet extending two-dimensionally in vertical and horizontal directions, the printing target may be any type of continuous document, such as an HTML document.

Further, the related data may be data other than a graph object and table object described in the embodiment, provided that the data has a relationship of one data object referencing another. Another example of such related data is text and a diagram referenced by the text.

What is claimed is:

1. A printing device comprising:
a processor comprising hardware configured to:
acquire original data representing a first object and a second object on a spreadsheet, the first object being a table object and the second object being a graph object, the first object and the second object being related to each other;
generate simulated printing data representing the original data, the simulated printing data having a plurality of pages;
determine from the simulated printing data whether one of the first object and the second object is positioned in one region in one page of the plurality;
determine, when the one of the first object and the second object is positioned in one region in one page, whether a remaining one of the first object and the second object is capable of being positioned in a remaining region of the one page;
generate first data based on the original data such that the first object and the second object are included in the one page when the processor determines that the one of the first object and the second object is positioned in the one region in the one page, and the remaining one of the first object and the second object is capable of being positioned in the remaining region of the one page;

generate second data based on the original data such that the first object is included in the one page and the second object is included in another page different from the one page when the processor determines that the one of the first object and the second object is positioned in the one region in the one page, and the remaining one of the first object and the second object is not capable of being positioned in the remaining region of the one page; and a printing unit that prints an image based on the first data.

2. The printing device according to claim 1, wherein the first object is a referenced object and the second object is a referencing object that is generated by referencing the referenced object, wherein the processor is configured to determine whether both the referenced object and the referencing object are capable of being both included in the one page by comparing sizes of the referenced object, the referencing object, and the one page, wherein the processor is configured to generate the first data such that the referenced object and the referencing object are included in the one page by adjusting at least one of positions of the referenced object and the referencing object.

3. The printing device according to claim 2, wherein, the processor is configured to generate, based on the original data, third data representing the first object and the second object on a spreadsheet divided into a plurality of pages;

the processor is configured to determine whether the referencing object is spread over more than one page based on the third data; and the processor is configured to determine whether the referencing object is capable of being included in the one page based on a size of the referencing object and the one page when the processor determines that the referencing object is spread over more than the one page, wherein the processor is configured to generate the second data such that the referencing object is included in the one page by adjusting the position of the referencing object when the processor determines that both the referenced object and the referencing object are incapable of being both included in the one page and when the processor determines that the referencing object is capable of being included in the one page.

4. The printing device according to claim 3, wherein the processor is configured to determine whether the referencing object is capable of being included in the one page by changing an orientation of the referencing object when the processor determines that the referencing object is incapable of being included in the one page, wherein when the processor determines that the referencing object is capable of being included in the one page by changing the orientation of the referencing object, the processor generates the first data such that the referencing object is included in the one page by changing the orientation of the referencing object.

5. The printing device according to claim 1, wherein, the processor is configured to generate third data representing the first object and the second object on a spreadsheet divided into a plurality of pages based on the original data;

the processor is configured to determine whether at least one of the first object and the second object is spread over more than the one page based on the third data;

wherein when the processor determines that the at least one of the first object and the second object is spread over more than the one page, the processor determines whether the first object and the second object are capable of being included in the one page by adjusting a position of the at least one of the first object and the second object.

6. The printing device according to claim 1, wherein the second object is defined such that a position of the second object is capable of being changed irrespective of a position of the first object.

7. The printing device according to claim 1, wherein the original data defines a positional relation between the first object and the second object, wherein the processor sets the second object in the one page irrespective of the positional relation between the first object and the second object.

8. A non-transitory computer readable storage medium storing a set of program instructions installed on and executed by a computer acquiring original data representing a first object and a second object on a spreadsheet, the first object being a table object and the second object being a graph object, the program instructions comprising:

generating simulated printing data representing the original data, the simulated printing data having a plurality of pages;

determining from the simulated printing data whether one of the first object and the second object is positioned in one region in one page of the plurality of pages;

determining, when the one of the first object and the second object is positioned in one region in one page, whether a remaining one of the first object and the second object is capable of being positioned in a remaining region of the one page;

generating print data based on the original data, wherein the generating generates the print data such that the first object and the second object are included in the one page when the determining determines that the one of the first object and the second object is positioned in the one region in the one page and the remaining one of the first object and the second object is capable of being positioned in the remaining region of the one page;

generating second data based on the original data such that the first object is included in the one page and the second object is included in another page different from the one page when the determining determines that the one of the first object and the second object is positioned in the one region in the one page, and the remaining one of the first object and the second object is not capable of being positioned in the remaining region of the one page; and sending the print data to a printing unit that prints an image based on the print data.

* * * * *